(12) United States Patent
Park

(10) Patent No.: US 12,341,407 B1
(45) Date of Patent: Jun. 24, 2025

(54) GENERATOR WITH MULTIPLE OUTPUTS

(71) Applicant: Myeong Su Park, Seoul (KR)

(72) Inventor: Myeong Su Park, Seoul (KR)

( * ) Notice: Subject to any disclaimer, the term of this patent is extended or adjusted under 35 U.S.C. 154(b) by 0 days.

(21) Appl. No.: 18/293,537

(22) PCT Filed: Mar. 13, 2023

(86) PCT No.: PCT/KR2023/003347
§ 371 (c)(1),
(2) Date: Jan. 30, 2024

(87) PCT Pub. No.: WO2024/122753
PCT Pub. Date: Jun. 13, 2024

(30) Foreign Application Priority Data

Dec. 9, 2022 (KR) .................. 10-2022-0171054

(51) Int. Cl.
| | | |
|---|---|---|
| *H02K 9/06* | (2006.01) | |
| *H02K 5/16* | (2006.01) | |
| *H02K 7/00* | (2006.01) | |
| *H02K 7/18* | (2006.01) | |
| *H02K 13/00* | (2006.01) | |
| *H02K 16/02* | (2006.01) | |

(52) U.S. Cl.
CPC ........... *H02K 7/1807* (2013.01); *H02K 5/161* (2013.01); *H02K 7/003* (2013.01); *H02K 9/06* (2013.01); *H02K 13/003* (2013.01); *H02K 16/02* (2013.01)

(58) Field of Classification Search
CPC ...... H02K 7/1807; H02K 7/003; H02K 5/161; H02K 9/06; H02K 13/003; H02K 16/02
See application file for complete search history.

(56) References Cited

U.S. PATENT DOCUMENTS

2013/0181562 A1   7/2013   Gieras et al.

FOREIGN PATENT DOCUMENTS

| CN | 201018445 Y | 2/2008 |
|----|---|---|
| CN | 101016882 B | 5/2010 |
| CN | 204992985 U | 1/2016 |
| CN | 108365718 B | 4/2019 |
| CN | 212183271 U | 12/2020 |
| KR | 102089743 B1 | 3/2020 |

*Primary Examiner* — Terrance L Kenerly
(74) *Attorney, Agent, or Firm* — Bridgeway IP Law Group, PLLC; Jihun Kim

(57) ABSTRACT

A generator with multiple outputs, includes: an outer housing; a stator having a first coil wound thereonto; a first rotor having a plurality of permanent magnets coupled thereto in circumferential and longitudinal directions thereof; a second rotor having a second coil wound thereonto; a driving part placed on the outside of the outer housing to provide a driving force so that the first rotor and the second rotor rotate in opposite directions to each other; and first and second output induction parts adapted to induce and output induced currents generated from the first coil and the second coil according to the rotation of the first rotor relative to the stator and the rotation of the second rotor relative to the first rotor to the outside of the outer housing. The generator becomes entirely compact in size and configuration, while producing a high output.

9 Claims, 6 Drawing Sheets

GENERATOR WITH MULTIPLE OUTPUTS

TECHNICAL FIELD

The present invention relates to a generator with multiple outputs that is capable of receiving a rotational output from a driving source and generating two induced currents through two isolated output ports.

BACKGROUND ART

Generally, a generator is a device that receives mechanical energy from an external power source and converts the mechanical energy into electrical energy, and methods for generating the electrical energy using the external power source include hydroelectric power generation, thermal power generation, nuclear power generation, solar power generation, etc.

The generator is provided with a rotor with permanent magnets coupled thereto and a stator with a coil wound thereon, and accordingly, an induced current generated from the coil of the stator is outputted for a variety of purposes.

According to the conventional generator, however, an output port for the induced current is located at one position of the generator, which has a limitation in generating an output having a given value or more. To solve such a problem, a generator with multiple rotors and stators has been developed, but such a generator becomes bulky in size and complicated in internal configuration, thereby resulting in poor productivity.

Therefore, a generator that is capable of being compact in size and configuration, while generating a high output, is proposed by the applicant of the present invention.

DISCLOSURE OF THE INVENTION

Technical Problems

Accordingly, the present disclosure has been made in view of the above-mentioned problems occurring in the related art, and it is an object of the present invention to provide a generator with multiple outputs that is capable of allowing one rotor to be located inside a stator and allow another rotor to be located inside one rotor so that the two rotors rotate in opposite directions to each other, thereby enabling the generator to become compact in size and configuration and producing a high output from the generator.

Technical Solutions

To accomplish the above-mentioned objects, according to the present invention, there is provided a generator with multiple outputs, the generator including: an outer housing having an internal space; a stator fixed to the inside of the outer housing, having a hollow structure, and wound with a first coil thereonto; a first rotor rotatably placed inside the stator in such a way as to be supported for rotation against the outer housing, having a hollow structure, and coupling a plurality of permanent magnets thereto in both circumferential and longitudinal directions thereof; a second rotor rotatably placed inside the first rotor in such a way as to be supported in rotation against the first rotor and wound with a second coil thereonto; a driving part placed on the outside of the outer housing to provide a driving force so that the first rotor and the second rotor rotate in opposite directions to each other; and first and second output induction parts adapted to induce and output induced currents generated from the first coil and the second coil according to the rotation of the first rotor relative to the stator and the rotation of the second rotor relative to the first rotor to the outside of the outer housing.

The outer housing may include: a housing case having the shape of a hollow cylinder whose both sides are open; and first and second housing caps coupled to both sides of the housing case in such a way as to close both open sides of the housing case, and wherein the first rotor may be supported in rotation against bearings located on the first and second housing caps.

The first and second housing caps may have first and second through holes formed on the central portions thereof, and the bearings may be mounted onto the inner peripheral surfaces of the first and second through holes.

The first and second housing caps may have first and second through holes formed on the central portions thereof, and the first rotor may include: a first rotor case having a first side rotor shaft passing through the first through hole in such a way as to be exposed to the outside of the outer housing, a connection block connected with the first side rotor shaft, and a plurality of magnet coupling bars protruding by a given length from the connection block in such a way as to be spaced apart from one another in a circumferential direction of the connection block to allow the plurality of permanent magnets to be coupled thereto in longitudinal directions thereof; and a first rotor cap having a second side rotor shaft passing through the second through hole in such a way as to be exposed to the outside of the outer housing and a coupling block coupled to protruding ends of the plurality of magnet coupling bars to prevent the plurality of permanent magnets from escaping from the plurality of magnet coupling bars.

The first side rotor shaft and the second side rotor shaft may be hollow.

The second rotor may include a second rotor shaft whose both ends pass through not only the first through hole and the second through hole, but also the first rotor shaft and the second rotor shaft, in a longitudinal direction thereof, and are thus exposed to the outside of the outer housing, wound with the second coil thereonto, wherein the second rotor shaft is supported in rotation against the bearings disposed between the connection block and the coupling block.

The second rotor shaft may have an output induction part installation groove formed on a given region thereof where the end thereof is located, so that the second output induction part connected to the second coil is located along the output induction part installation groove.

At least one of the first housing cap and the second housing cap may be formed with a plurality of air ventilation holes, and at least one of the first side rotor shaft and the second side rotor shaft may be formed with a fan for blowing external air to the inside of the outer housing through the plurality of air ventilation holes.

The first output induction part may be connected to the first coil and thus exposed to the outside of the outer housing, and the second output induction part may include slip rings formed continuously on the end portion of the second rotor shaft connected to the second coil and thus exposed to the outside of the outer housing in a circumferential direction of the second rotor shaft.

The driving part may include: a first rotating shaft receiving a rotating output of a driving source and thus rotating in one direction; a first power transmitter transferring the rotary force of the first rotating shaft to the first side rotor shaft or the second side rotor shaft and thus rotating the first side rotor shaft or the second side rotor shaft in one direction; a second rotating shaft whose one end comes into contact with the first power transmitter to rotate in the other direction by means of the operation of the first power transmitter; and a second power transmitter transferring the rotary force of the other end of the second rotating shaft rotating in the other direction to one side of the second rotor shaft and thus rotating the second rotor shaft in the other direction.

Advantageous Effects of the Invention

According to the present invention, the generator with multiple outputs is configured to allow the first rotor to be located inside the stator and allow the second rotor to be located inside the first rotor so that the first and second rotors rotate in opposite directions to each other, thereby enabling the generator to be compact in size and configuration and producing a high output from the generator.

While the first side rotor shaft is rotating with the rotary force of the first rotating shaft, further, the fan rotates together with the first side rotor shaft, without having any additional driving force, so that the entire generator is simplified in configuration and the internal heating is prevented to maximize power generation efficiency.

BEST MODE FOR INVENTION

Figure 1:
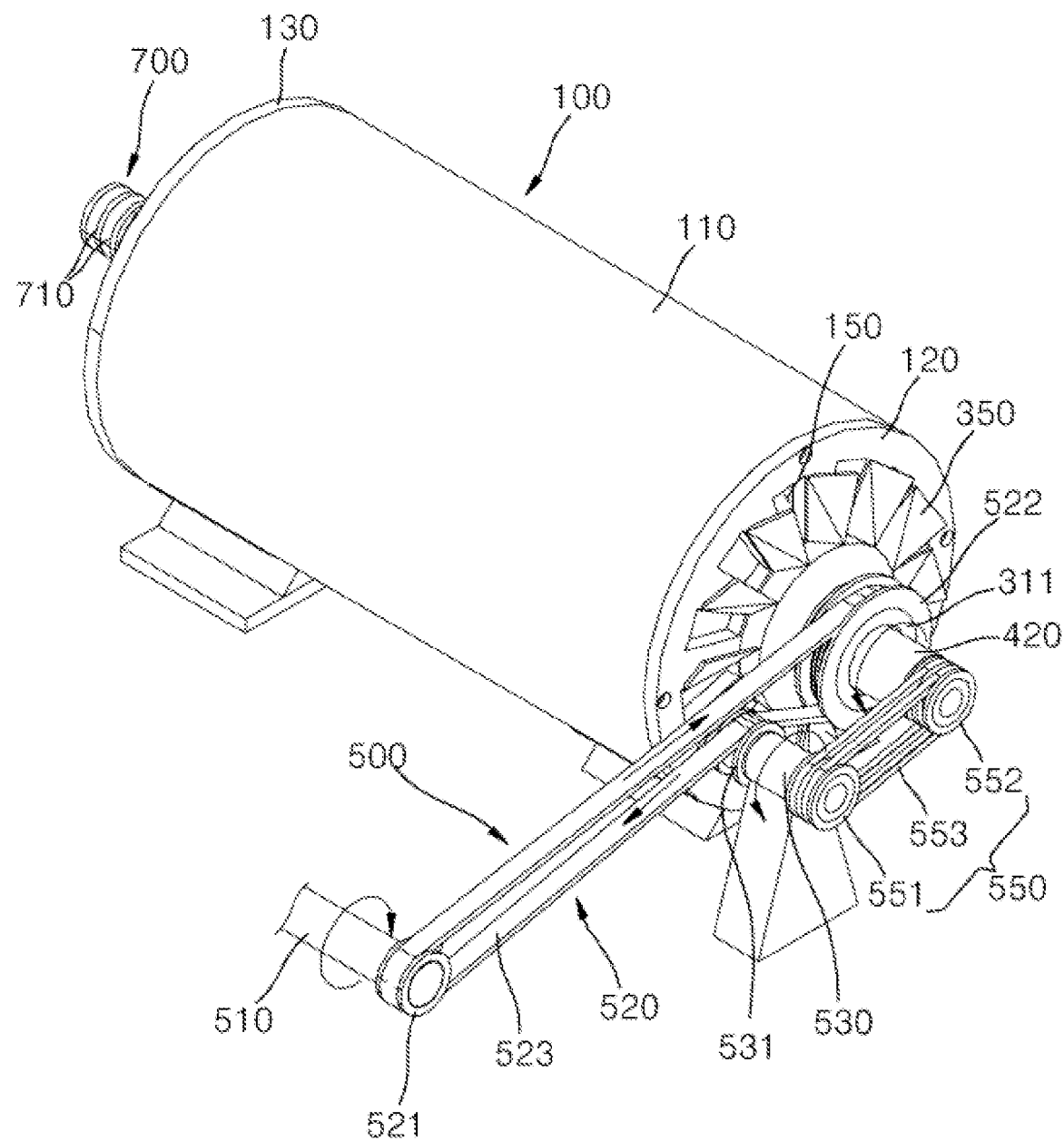
FIG. 1 is a perspective view showing a generator with multiple outputs according to an embodiment of the present invention.

Hereinafter, an embodiment of the present invention will be described in detail below with reference to the accompanying drawings. However, the present invention may be modified in various ways, without being limited to the embodiment as will be described below, and the embodiment of the present invention allows the disclosure to be perfect and makes the scope of the present invention completely recognized by one of ordinary skill in the art. Through the accompanying drawings, the same reference numerals will be used to describe the same components.

A generator with multiple outputs according to an embodiment of the present invention is compact in size and configuration, while generating a high output, and to do this, the generator receives a rotational output from a driving source to output two induced currents through two output ports isolated from each other, so that electrical energy is produced from the two ports through a single generator, thereby maximizing power generation efficiency.

Hereinafter, an embodiment of the present invention will be explained in detail.

As shown in FIGS. 1 to 4, a generator with multiple outputs according to an embodiment of the present invention includes an outer housing 100, a stator 200, a first rotor 300, a second rotor 400, a driving part 500, a first output induction part 600, and a second output induction part 700.

First, as shown in FIGS. 1 to 4, the outer housing 100 has an internal space and includes a housing case 110, a first housing cap 120, and a second housing cap 130.

The housing case 110 has the shape of a hollow cylinder whose both sides are open.

The first housing cap 120 is coupled to the housing case 110 to close one side opening of the housing case 110, and the second housing cap 130 is coupled to the housing case 110 to close the other side opening of the housing case 110. The first housing cap 120 and the second housing cap 130 are separably coupled to the housing case 110 by means of screws, etc.

The first housing cap 120 has a first through hole 121 formed on the central portion thereof, and the second housing cap 130 has a second through hole 131 formed on the central portion thereof. Further, stepped projections are formed on the inner peripheral surfaces of the first through hole 121 and the second through hole 131 on the insides of the first housing cap 120 and the second housing cap 130 in such a way as to allow bearings 140 as will be discussed later to be mounted thereonto.

Figure 3:
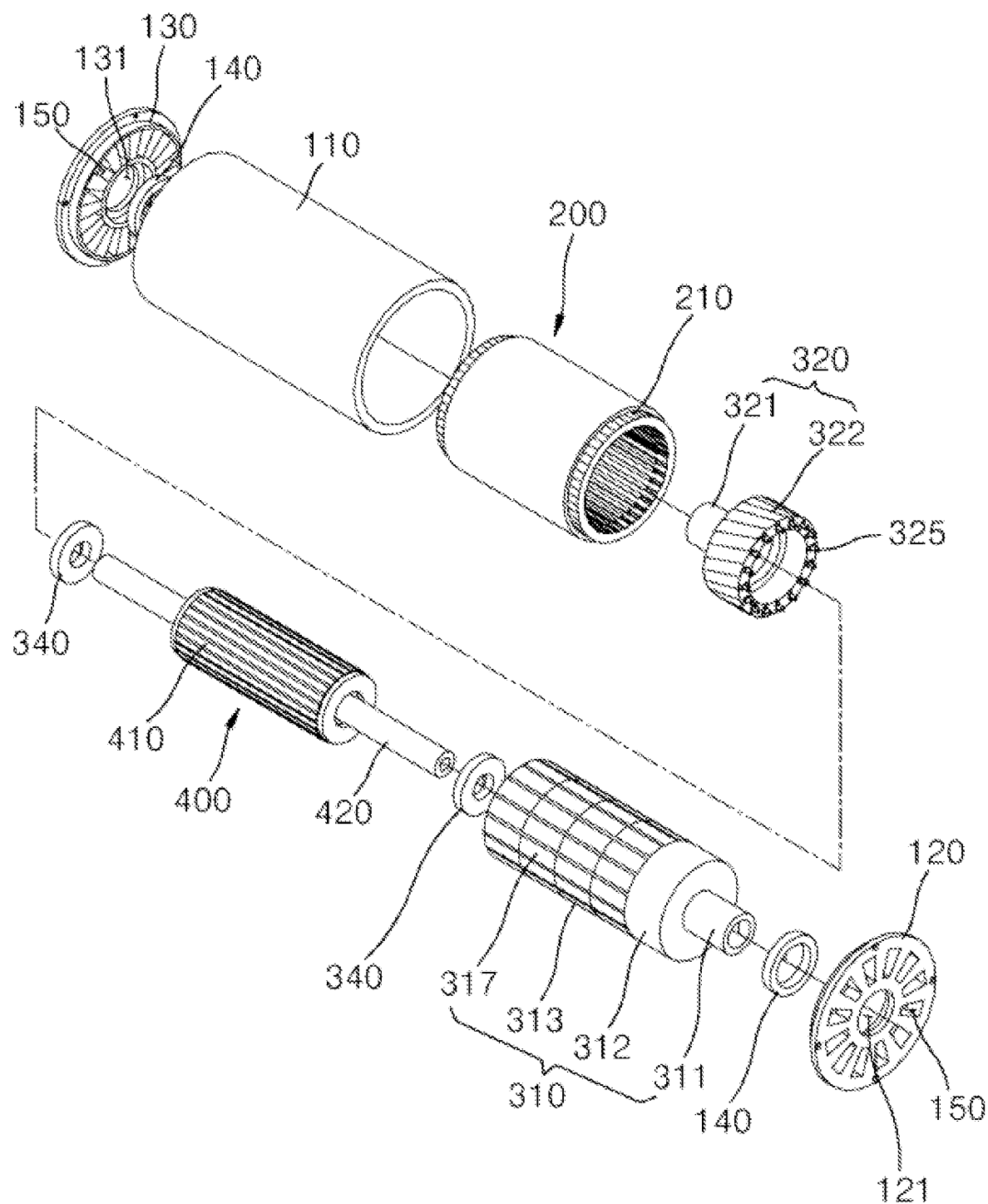
FIG. 3 is an exploded perspective view showing the generator with multiple outputs according to the embodiment of the present invention.
Figure 4:
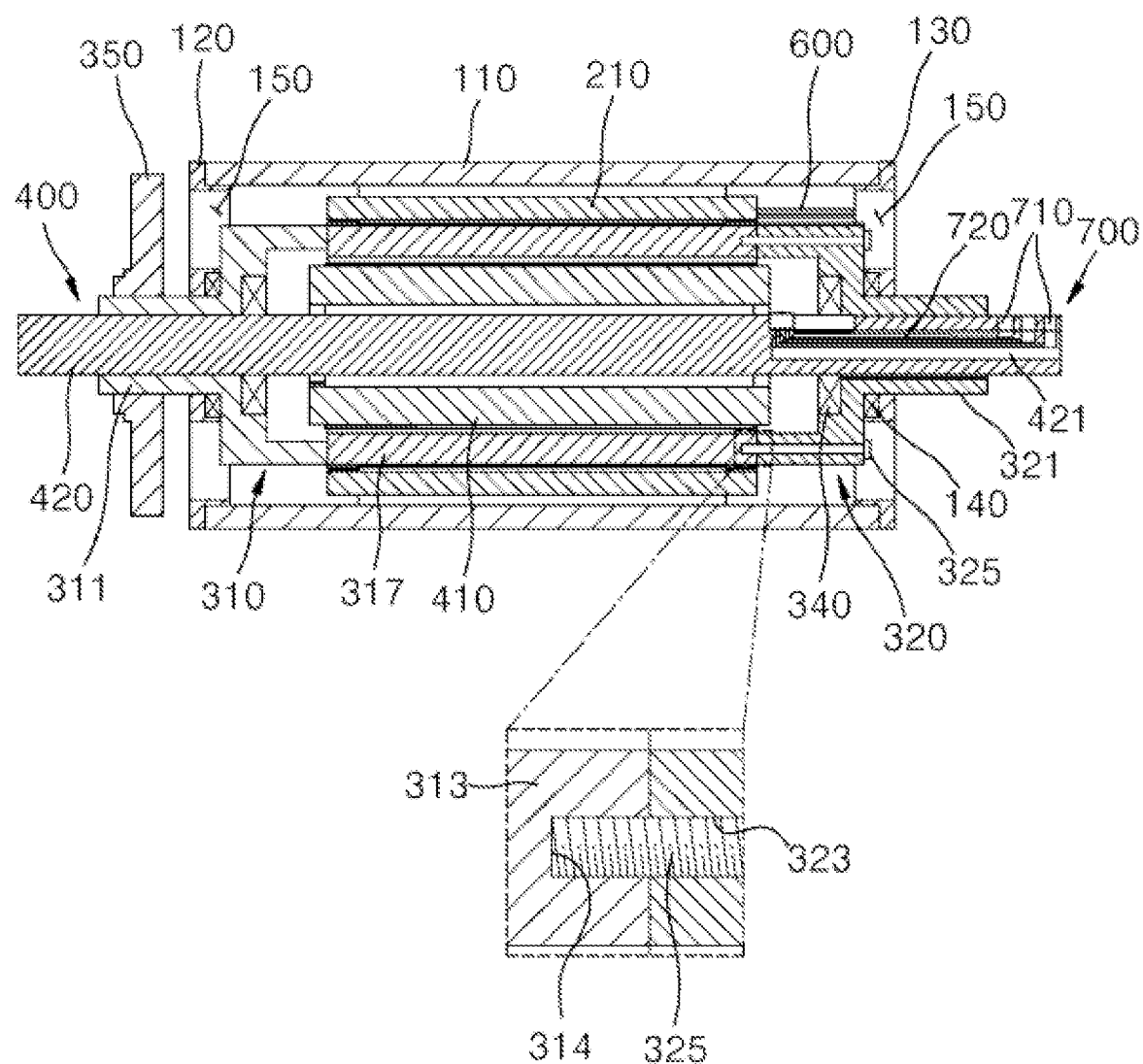
FIG. 4 is a sectional view showing a coupled state of FIG. 3.

Next, as shown in FIGS. 3 and 4, the stator 200 is fixed to the inside of the outer housing 100, configured to allow the first rotor 300 and the second rotor 400 as will be discussed later to pass through the inside central portion thereof in a longitudinal direction thereof, and has a first coil 210 wound thereonto.

After that, as shown in FIGS. 3 and 4, the first rotor 300 is rotatably placed inside the stator 200 in such a way as to be supported in rotation against the outer housing 100.

In detail, the first rotor 300 is supported in rotation against the bearings 140 placed on the first housing cap 120 and the second housing cap 130.

In this case, the bearings 140 are provided on the inner peripheral surface of the first through hole 121 of the first housing cap 120 and on the inner peripheral surface of the second through hole 131 of the second housing cap 130, and as mentioned above, the bearings 140 are mounted onto the stepped projections. The inner rings of the bearings 140 are fixed to the outer peripheral surfaces of a first side rotor shaft 311 and a second side rotor shaft 321 of the first rotor 300 as will be discussed later and rotate together with the first rotor 300, thereby supporting the rotation of the first rotor 300.

The first rotor 300 is configured to allow the second rotor 400 as will be discussed later to pass therethrough in a longitudinal direction thereof, and a plurality of permanent magnets 317 are coupled to the first rotor 300 in circumferential and longitudinal directions of the first rotor 300.

In detail, the first rotor 300 includes a first rotor case 310 and a first rotor cap 320.

Figure 5:
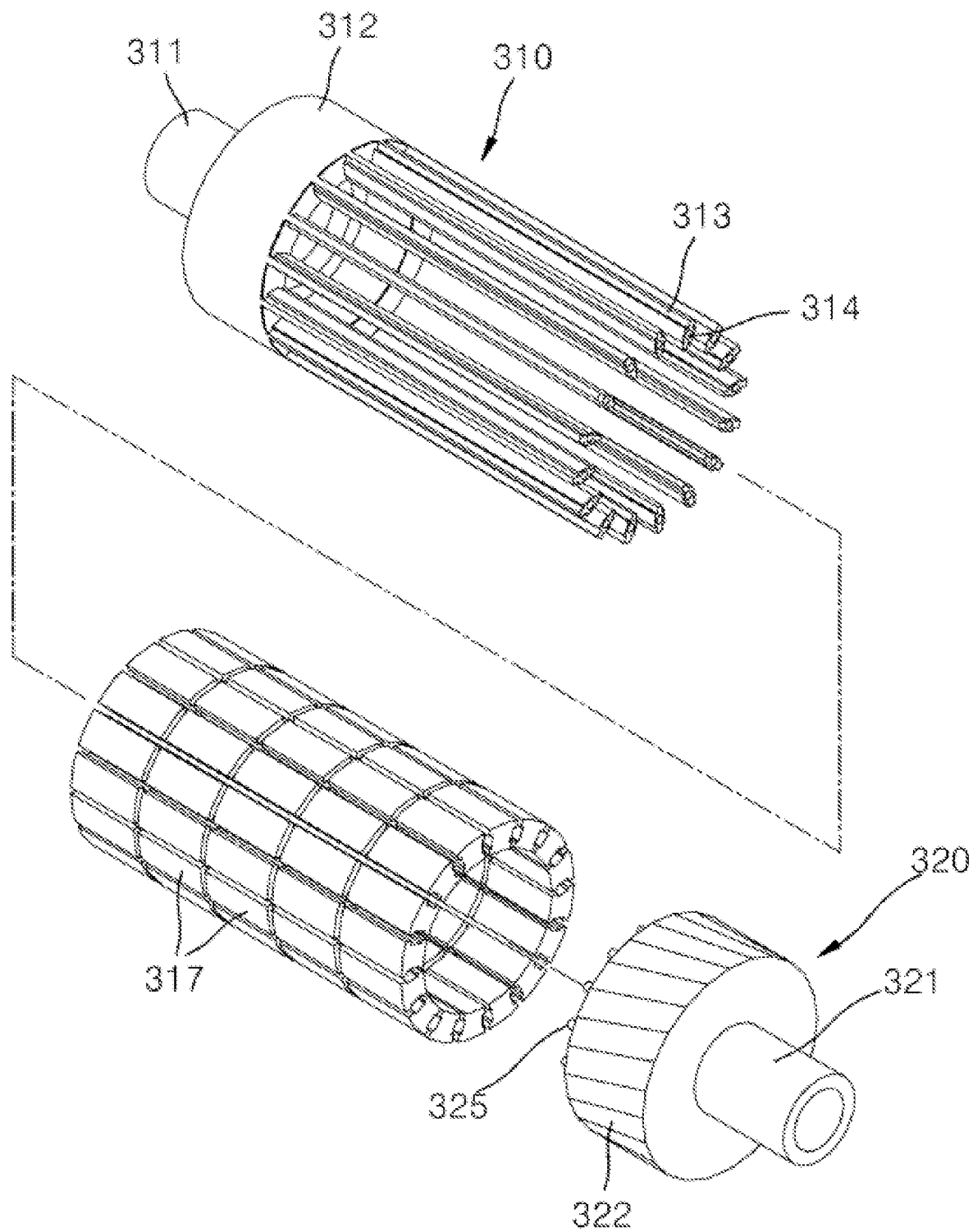
FIG. 5 is an exploded perspective view showing a first rotor of the generator with multiple outputs according to the embodiment of the present invention.
Figure 6:
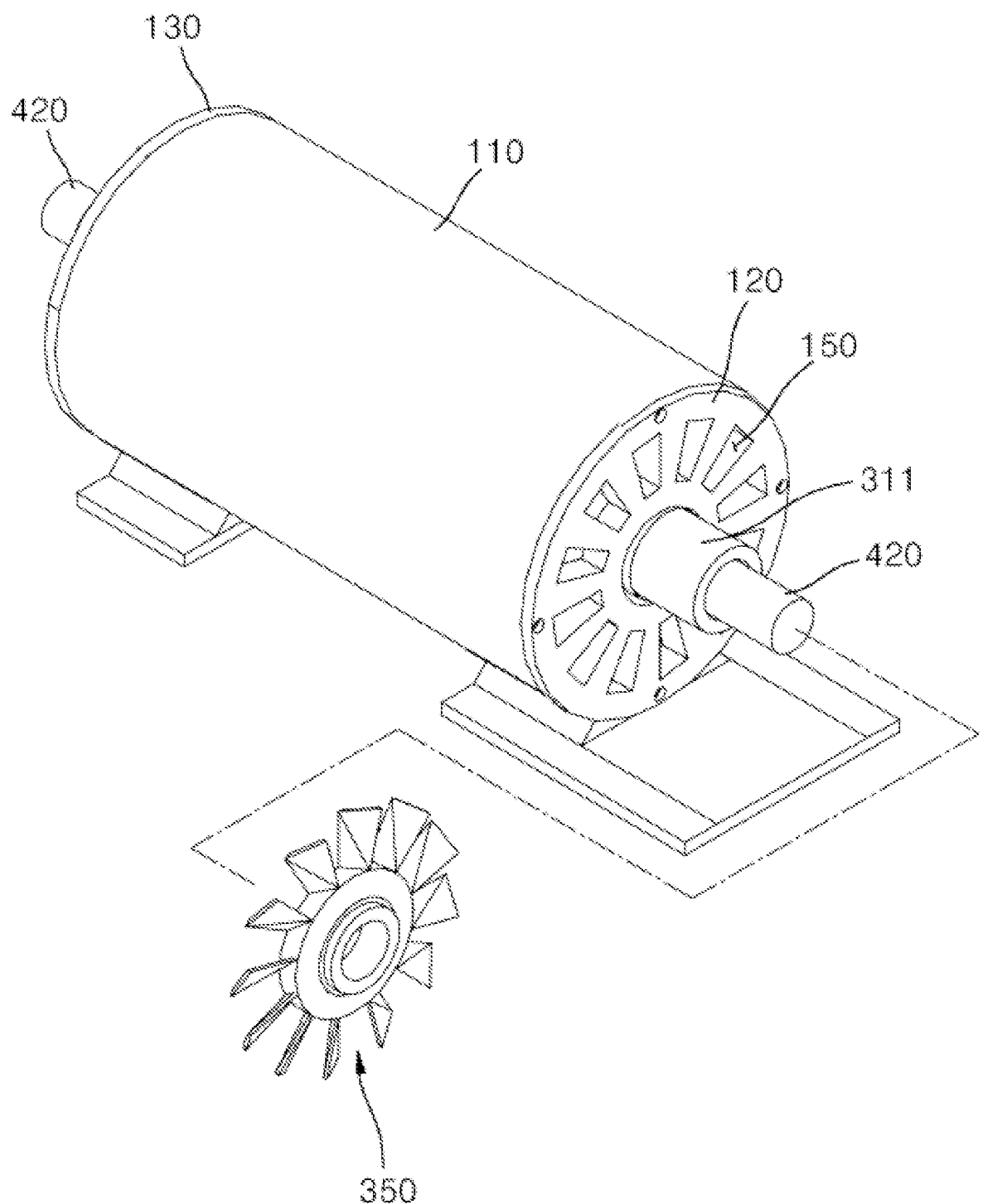
FIG. 6 is a perspective view showing a coupled state of a fan of the generator with multiple outputs according to the embodiment of the present invention.

As shown in FIGS. 3 to 5, the first rotor case 310 includes the first side rotor shaft 311, a connection block 312, and a plurality of magnet coupling bars 313.

The first side rotor shaft 311 passes through the first through hole 121 of the first housing cap 120 and is thus exposed to the outside of the outer housing 100. The connection block 312 is connected integrally with the first side rotor shaft 311 and has a generally cylindrical structure.

In this case, the first side rotor shaft 311 is hollow so that it allows one side of a second rotor shaft 420 of the second rotor 400 as will be discussed later to pass therethrough along a longitudinal direction thereof.

The magnet coupling bars 313 protrude from the connection block 312 in such a way as to be spaced apart from one another in a circumferential direction of the connection block 312. In this case, the plurality of permanent magnets 317 are coupled between the neighboring pair of magnet coupling bars 313 in longitudinal directions of the magnet coupling bars 313.

Further, as shown in FIG. 5, each magnet coupling bar 313 has protruding bars from both side surfaces thereof, and to allow the permanent magnet 317 to be inserted into the space between the neighboring magnet coupling bars 313 in the longitudinal directions of the magnet coupling bars 313, each permanent magnet 317 has a roughly 'I'-shaped section.

The first rotor cap 320 includes the second rotor shaft 321 and a coupling block 322.

The second side rotor shaft 321 passes through the second through hole 131 of the second housing cap 130 and is thus exposed to the outside of the outer housing 100. The coupling block 322 is connected integrally with the second side rotor shaft 321 and has a generally cylindrical structure.

According to the embodiment of the present invention, the coupling block 322 is coupled to the protruding ends of the plurality of magnet coupling bars 313 to prevent the plurality of permanent magnets 317 from escaping from the plurality of magnet coupling bars 313. For example, as shown in FIGS. 4 and 5, the coupling block 322 has a plurality of cap through holes 323 formed thereon in a thickness direction thereof in such a way as to correspond to the plurality of magnet coupling bars 313, and the plurality of magnet coupling bars 313 has a plurality of coupling bar coupling grooves 314 formed on the protruding ends thereof in such a way as to correspond to the plurality of cap through holes 323. Besides, the coupling block 322 has cap bolts 325 passing through the cap through holes 323 in such a way as to be fastened to the coupling bar coupling grooves 314.

In this case, the second side rotor shaft 321 is hollow so that it allows the other side of the second rotor shaft 420 of the second rotor 400 as will be discussed later to pass therethrough along a longitudinal direction thereof.

According to the embodiment of the present invention, the connection block 312 and the coupling block 322 have through holes formed on the central portions thereof, and the through holes have stepped projections formed on the inner peripheral surfaces thereof in such a way as to mount bearings 340 thereonto, so that the second rotor shaft 420 of the second rotor 400 is supported in rotation against the bearings 340.

Next, as shown in FIGS. 3 and 4, the second rotor 400 is rotatably placed inside the first rotor 300 in such a way as to be supported in rotation against the first rotor 300 and has a second coil 410 wound thereon.

The second rotor 400 has the second rotor shaft 420 whose both ends pass through the first through hole 121 and the second through hole 131, pass through the first rotor shaft 311 and the second rotor shaft 321 in a longitudinal direction thereof, and are thus exposed to the outside of the outer housing 100. Further, the second rotor 400 has the second coil 410 wound onto the second rotor shaft 420.

In this case, the second rotor shaft 420 of the second rotor 400 is supported in rotation against the bearings 340 disposed between the connection block 312 and the coupling block 322.

The bearings 340 are provided on the inner peripheral surfaces of the connection block 312 and the coupling block 322, and as mentioned above, they are mounted on the stepped projections. The inner rings of the bearings 340 are fixed to the outer peripheral surfaces of both ends of the second rotor shaft 420 of the second rotor 400 and rotate together with the second rotor 400, thereby supporting the rotation of the second rotor 400.

Figure 2:
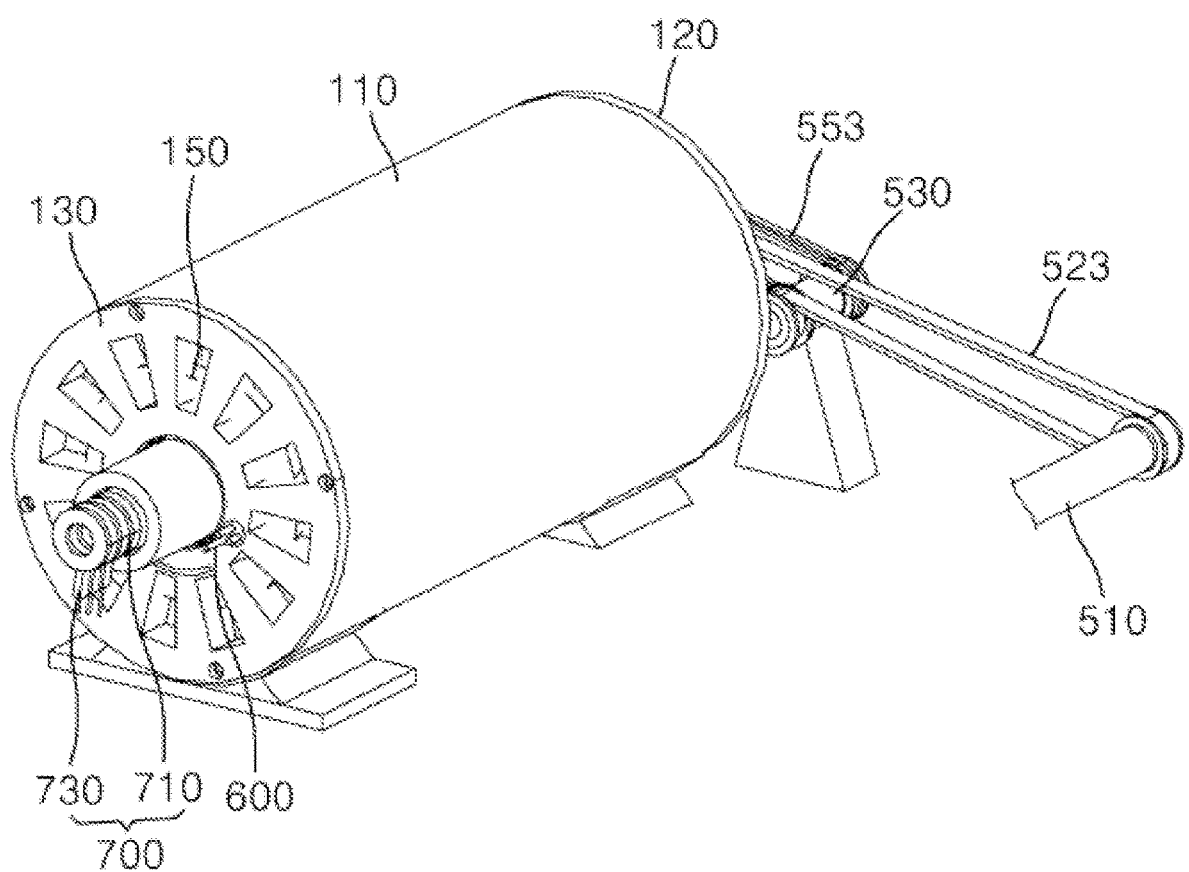
FIG. 2 is a perspective view showing the rear side of FIG. 1.

Next, as shown in FIGS. 1 and 2, the driving part 500 is placed on the outside of the outer housing 100 and provides a driving force to allow the first rotor 300 and the second rotor 400 to rotate in opposite directions to each other.

That is, as the driving part 500 operates, the first rotor 300 rotates relative to the stator 200 to permit an induced current to be generated from the first coil 210, and in the same manner as above, the second rotor 400 rotates relative to the first rotor 300 to permit an induced current to be generated from the second coil 410.

According to the embodiment of the present invention, as shown in FIGS. 1 and 2, the driving part 500 includes a first rotating shaft 510, a first power transmitter 520, a second rotating shaft 530, and a second power transmitter 550.

The first rotating shaft 510 receives the rotational output of a driving source (not shown) and thus rotates in one direction. In this case, all types of power devices such as a vehicle engine, an output shaft of a wind power generator, a motor, and the like may be adopted as the driving source (not shown) only if they rotate the first rotating shaft 510 in one direction.

The first power transmitter 520 transfers the rotary force of the first rotating shaft 510 to the first side rotor shaft 311 or the second side rotor shaft 321 and thus rotates the first side rotor shaft 311 or the second side rotor shaft 321 in one direction.

For example, in the drawings, the rotary force of the first rotating shaft 510 is transferred to the first side rotor shaft 311, and such an embodiment will be explained below for the conveniences of description and illustration.

In detail, the first power transmitter 520 includes a first pulley 521 connected to the first rotating shaft 510 in such a way as to rotate together with the first rotating shaft 510, a second pulley 522 coupled to the first side rotor shaft 311 in such a way as to rotate together with the first side rotor shaft 311, and a first belt 523 connecting the first pulley 521 and the second pulley 522 to each other. In this case, the first pulley and the second pulley are timing pulleys, and the first belt is a timing belt. However, they may not be limited thereto. Further, such a pulley-belt structure may be changed to a sprocket wheel-chain structure, a gear module, etc.

Therefore, the first rotating shaft 510 and the first side rotor shaft 411 rotate in the same direction.

The second rotating shaft 530 is rotatably supported against an additional bracket placed around the outer housing 100.

One end of the second rotating shaft 530 comes into contact with the first power transmitter 520, that is, the first belt 523 so that the second rotating shaft 530 rotates in the other direction by means of the operation of the first belt 523. That is, the rotational direction of the first side rotor shaft 311 is opposite to the rotational direction of the second rotating shaft 530. The second rotating shaft 530 has a third pulley 531 located integrally on one end thereof, and accordingly, the third pulley 531 rotates together with the second rotating shaft 530 and sufficiently transfers the rotary force of the first belt 523 to the second rotating shaft 530. In this case, the third pulley 531 rotates through frictional contact with the outer peripheral surface of the first belt 523.

If the first rotating shaft 510 rotates in one direction, accordingly, the first side rotor shaft 311 rotates in one direction, whereas the second rotating shaft 530 rotates in the other direction.

Next, the second power transmitter 550 transfers the rotary force of the other end of the second rotating shaft 530 rotating in the other direction to one end of the second rotor shaft 420 and thus rotates the second rotor shaft 420 in the other direction.

In detail, the second power transmitter 550 includes a fourth pulley 551 connected to the other end of the second rotating shaft 530 in such a way as to rotate together with the second rotating shaft 530, a fifth pulley 552 coupled to one end of the second rotor shaft 420 in such a way as to rotate together with the second rotor shaft 420, and a second belt 553 connecting the fourth pulley 551 and the fifth pulley 552 to each other. In this case, the fourth pulley and the fifth pulley are timing pulleys, and the second belt is a timing belt. However, they may not be limited thereto.

Accordingly, the second rotating shaft 530 and the second rotor shaft 420 rotate in the same direction, and the first side rotor shaft 311 and the second rotor shaft 420 rotate in the opposite directions to each other. Therefore, the plurality of permanent magnets 317 rotate relative to the first coil 210 fixed inside the outer housing 100. Further, the permanent magnets 317 and the second rotor shaft 420 onto which the second coil 410 is wound rotate in the opposite directions to each other inside the outer housing 100 so that they rotate relative to each other. Accordingly, the induced currents are generated from the first coil 210 and the second coil 410.

In a process where the induced currents are generated from the first coil 210 and the second coil 410 inside the outer housing 100, further, an internal temperature of the outer housing 100 increases to cause internal parts to be overheated. Such overheating makes the durability of the entire generator quickly deteriorated or causes the generator to be damaged or broken.

To prevent such problems from occurring, according to the embodiment of the present invention, as shown in FIGS. 1 to 4 and 6, at least one of the first housing cap 120 and the second housing cap 130 has a plurality of air ventilation holes 150 adapted to allow external air to be introduced from the outside of the outer housing 100 to the inside of the outer housing 100. In the corresponding drawings, the air ventilation holes 150 are formed on both of the first housing cap 120 and the second housing cap 130, and in this case, the internal parts can be more efficiently prevented from being overheated than the case where the air ventilation holes 150 are formed on either the first housing cap 120 or the second housing cap 130.

Further, a fan 350 is located on at least one of the first side rotor shaft 311 and the second side rotor shaft 321 in such a way as to blow the external air to the inside of the outer housing 100 through the air ventilation holes 150. The fan 350 rotates together with at least one of the first side rotor shaft 311 and the second side rotor shaft 321 and thus blows the external air to the inside of the outer housing 100.

Further, the fan 350 is fitted to the second rotor shaft 420 in such a way as to rotate together with the second rotor shaft 420.

While the first side rotor shaft 311 is rotating with the rotary force of the first rotating shaft 510, that is, the fan 350 rotates together with the first side rotor shaft 311, without having any additional driving force, so that the entire generator is simplified in configuration and the internal heating is prevented to maximize the power generation efficiency.

According to the embodiment of the present invention, the air ventilation holes 150 may be formed on both of the first housing cap 120 and the second housing cap 130, and the fan 350 may be fitted to both of the first side rotor shaft 311 and the second side rotor shaft 321. Otherwise, the fan 350 may be fitted to one end or/and the other end of the second rotor shaft 420, not fitted to the first side rotor shaft 311 and the second side rotor shaft 321.

Next, as shown in FIGS. 2 and 4, the first output induction part 600 and the second output induction part 700 are kinds of conductive wires and serve to induce the induced currents generated from the first coil 210 and the second coil 410 according to the rotation of the first rotor 300 relative to the stator 200 and the rotation of the second rotor 400 relative to the first rotor 300 to the outside of the outer housing 100, so that the induced currents are outputted.

The first output induction part 600 is connected to the first coil 210 and thus exposed to the outside of the outer housing 100, and the second output induction part 700 is connected to the second coil 410 and thus exposed to the outside of the outer housing 100. The induced currents induced to the outside of the outer housing 100 through the first output induction part 600 and the second output induction part 700 are used in charging batteries through separate electrical connection devices or stored in ESS.

Since the first coil 210 is fixedly disposed inside the outer housing 100, further, the first output induction part 600 is connected to the first coil 210 and thus exposed to the outside of the outer housing 100, without any big difficulties, but since the second coil 410 rotates inside the outer housing 100, it is hard to configure the second output induction part 700 in the outer housing 100.

According to the embodiment of the present invention, as shown in FIG. 4, an output induction part installation groove 421 is formed on a given region of the second rotor shaft 420 where the end of the second rotor shaft 420 is placed, so that the second output induction part 700 connected to the second coil 410 is placed along the output induction part installation groove 421.

In this case, as shown in FIGS. 2 and 4, the second output induction part 700 includes slip rings 710 formed continuously on the end portion of the second rotor shaft 420 connected to the second coil 410 and thus exposed to the outside of the outer housing 100 in a circumferential direction of the second rotor shaft 420, a second output wire 720 disposed in the output induction part installation groove 421 in such a way as to electrically connect the slip rings 710 and the second coil 410 to each other, and brushes 730 located close to the second rotor shaft 420 in such a way as to always have sliding contact with the slip rings 710 rotating, so that the induced current becomes conductive.

Accordingly, the induced current generated from the second coil 410 rotating passes through the second output wire 720 and the slip rings 710 sequentially and is thus induced to a device where the induced current is used by means of the brushes 730. In this case, the plurality of slip rings 710 and the plurality of brushes 730 are provided, and the brushes 730 are fixedly located on a position close to the second rotor shaft 420 so that they always have sliding contact with the slip rings 710.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

The present invention is configured to allow one rotor to be placed inside the stator and allow another rotor to be placed inside one rotor so that the two rotors rotate in opposite directions to each other, thereby enabling the generator to be compact in size and configuration and generating a high output from the generator.

The invention claimed is:

1. A generator with multiple outputs, comprising:
an outer housing having an internal space;
a stator fixed to an inside of the outer housing, having a hollow structure, and wound with a first coil thereonto;
a first rotor rotatably placed inside the stator to be supported for rotation against the outer housing, having a hollow structure, and coupling a plurality of permanent magnets thereto in both circumferential and longitudinal directions thereof;
a second rotor rotatably placed inside the first rotor to be supported in rotation against the first rotor and wound with a second coil thereonto;
a driving part placed on an outside of the outer housing to provide a driving force so that the first rotor and the second rotor rotate in opposite directions to each other; and
first and second output induction parts adapted to induce and output induced currents generated from the first coil and the second coil according to a rotation of the first rotor relative to the stator and a rotation of the second rotor relative to the first rotor to the outside of the outer housing,
wherein the outer housing comprises:
a housing case having a hollow cylinder shape, the housing case having both sides that are open; and
first and second housing caps coupled to the both sides of the housing case to close the both sides of the housing case,
wherein the first and second housing caps have first and second through holes defined on central portions thereof, and
wherein the first rotor comprises:
a first rotor case having a first side rotor shaft passing through the first through hole to be exposed to the outside of the outer housing, a connection block connected with the first side rotor shaft, and a plurality of magnet coupling bars protruding from the connection block to be spaced apart from one another in a circumferential direction of the connection block to allow the plurality of permanent magnets to be coupled thereto in longitudinal directions thereof; and
a first rotor cap having a second side rotor shaft passing through the second through hole to be exposed to the outside of the outer housing and a coupling block coupled to protruding ends of the plurality of magnet coupling bars to prevent the plurality of permanent magnets from escaping from the plurality of magnet coupling bars.

2. The generator according to claim 1, wherein the first rotor is supported in rotation against bearings located on the first and second housing caps.

3. The generator according to claim 2, the bearings are mounted onto inner peripheral surfaces of the first and second through holes.

4. The generator according to claim 1, wherein the first side rotor shaft and the second side rotor shaft are hollow.

5. The generator according to claim 1, wherein the second rotor comprises a second rotor shaft whose both ends pass through the first through hole, the second through hole, the first rotor shaft, and the second rotor shaft, in a longitudinal direction thereof, to be exposed to the outside of the outer housing,
wherein the second rotor shaft is supported in rotation against the bearings disposed between the connection block and the coupling block.

6. The generator according to claim 5, wherein the second rotor shaft has an output induction part installation groove defined on a region thereof where an end thereof is located, so that the second output induction part connected to the second coil is located along the output induction part installation groove.

7. The generator according to claim 5, wherein the first output induction part is connected to the first coil to be exposed to the outside of the outer housing, and
wherein the second output induction part comprises slip rings defined continuously on an end portion of the second rotor shaft connected to the second coil to be exposed to the outside of the outer housing in a circumferential direction of the second rotor shaft.

8. The generator according to claim 5, wherein the driving part comprises:
a first rotating shaft receiving configured to receive a rotational output of a driving source to rotate in one direction;
a first power transmitter transferring a rotary force of the first rotating shaft to the first side rotor shaft or the second side rotor shaft to rotate the first side rotor shaft or the second side rotor shaft in one direction;
a second rotating shaft whose one end comes into contact with the first power transmitter to rotate in another direction by an operation of the first power transmitter; and
a second power transmitter transferring the a rotary force of another end of the second rotating shaft rotating in the another direction to one end of the second rotor shaft to rotate the second rotor shaft in another direction.

9. The generator according to claim 1, wherein at least one of the first housing cap and the second housing cap has a plurality of air ventilation holes, and
wherein at least one of the first side rotor shaft and the second side rotor shaft has a fan for blowing external air to the inside of the outer housing through the plurality of air ventilation holes.

* * * * *